Jan. 10, 1928.　　　　　　　　　　　　　　　　1,656,016
P. B. REEVES
BELT SPLICE
Filed Oct. 26, 1925

INVENTOR.
Paul B. Reeves,
BY
Hood & Hahn.
ATTORNEYS

Patented Jan. 10, 1928.

1,656,016

UNITED STATES PATENT OFFICE.

PAUL B. REEVES, OF COLUMBUS, INDIANA, ASSIGNOR TO REEVES PULLEY COMPANY, OF COLUMBUS, INDIANA, A CORPORATION OF INDIANA.

BELT SPLICE.

Application filed October 26, 1925. Serial No. 64,836.

My invention relates to improvements in driving belts and particularly to that type of driving belt used in connection with the type of transmission which for a long period has been commercially known as the "Reeves" transmission. In this type of transmission the driving belt usually comprises a flexible continuous band usually formed of fabric. On one face of this band there is secured a series of cross bars in the form of wooden blocks the end faces of which are inclined inwardly and provided with leather facings. The blocks as a whole are generally wedge shaped and have their tops curved, being secured to the band transversely by any suitable securing means.

It is the object of my present invention to provide means for connecting the free ends of the belt to form a continuous belt and to make this connection in such a manner that the ends may be readily connected or disconnected, the connection at the same time being such that it will not interfere with the curving or bending of the belt in passing over the discs of the Reeves type of transmission.

For the purpose of disclosing my invention I have illustrated one embodiment thereof in the accompanying drawings in which Fig. 1 is a plan view of the type of transmission with which my belt is particularly adapted for use;

Figure 1:
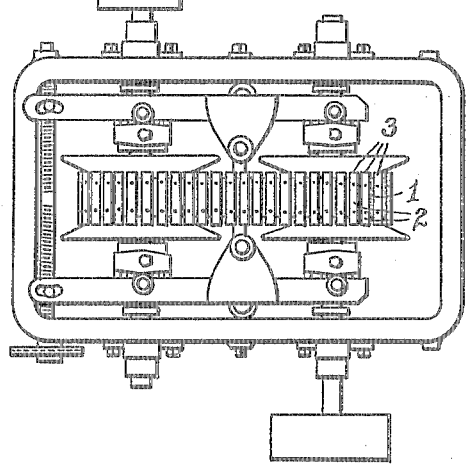
Figure 2:
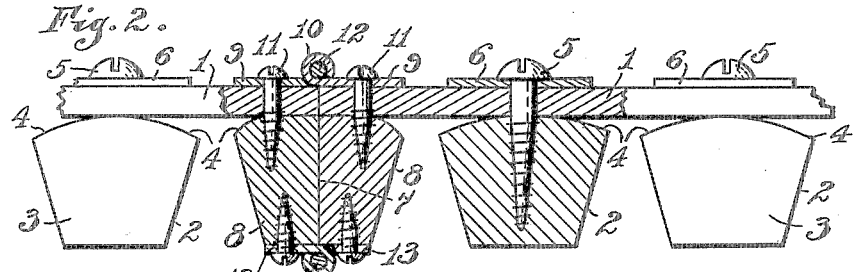
Fig. 2 is a side elevation of a portion of the belt partly in section and showing particularly the connection for the two ends.
Figure 3:
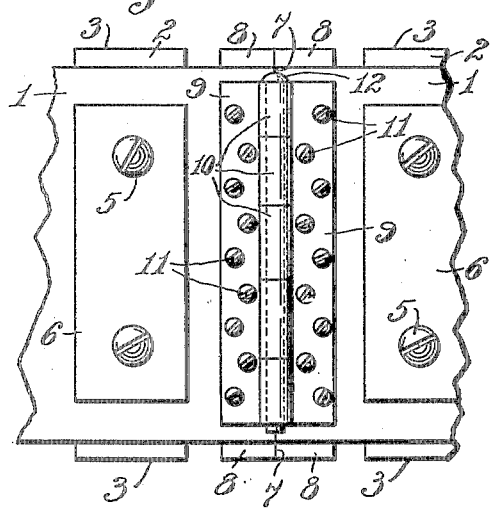
Fig. 3 is a plan view of the connection.

In the embodiment illustrated the belt comprises the flexible band 1 to which at regular intervals are secured the wedge shaped cross bars 2, these bars at their ends being inclined downwardly and inwardly and provided with leather friction faces 3. The tops of the bars are curved at 4 and the bars are secured transversely to the band by screws 5 which pass through metal plates 6 through the band 1 and into the bars.

At the point where the free ends of the band are brought together the cross bar is split along the line 7 forming the two sections 8, 8. A free end of the band 1 is secured on the top of a section 8 with its edge aligned with the meeting face of the section and this end is secured in place by a plate 9 having interdigitating loop fingers 10. The plate 9 is secured to the block section by means of screws 11 which pass through the plate, the end of the band and into the block section. The interdigitating loop fingers of the two sections are connected together by a pin 12 which passes through the loops. The bottom faces of the sections 8 have secured thereon similarly constructed interlocking plates 13 the interdigitating portions 14 of which are connected by pins 15 passing through the loops thereof.

Due to this structure the joint made in the belt is on the top of one of the friction blocks and therefore the arc of the belt is maintained constant as the belt passes over the driving pulleys. Furthermore, the two ends of the belt are properly aligned when the connection is made and the connection is such that the ends may be readily disconnected to permit the removal of the belt for repairs, inspection, etc.

Figure 4:
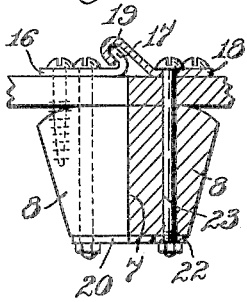
Fig. 4 is a side elevation partly in section of a modification thereof.
Figure 5:
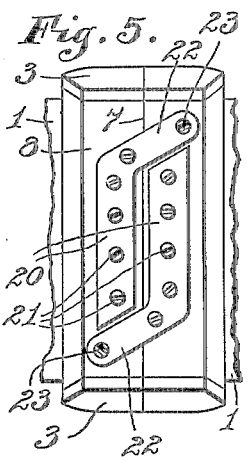
Fig. 5 is a bottom plan of the connection illustrated in Fig. 4.

In Figs. 4 and 5 I have illustrated a modified form wherein on one of the sections 8 there is provided a plate 16 somewhat similar to the plate 9 and having an upwardly and rearwardly extending ear 17. On the opposite block there is secured a plate 18 having a hook 19 adapted to make interlocking engagement with the ear 17. After the connection has been made at this point the lower ends of the sections are drawn together and held in position by interlocking plates each of which comprises an L shaped plate the leg 20 of which is secured by screws 21 to the block section 8 and the angled stem 22 lies across the opposite section and is secured thereto by a suitable bolt 23.

I claim as my invention:

1. A driving belt comprising a flexible band and a series of transversely extending end-friction blocks secured on one face thereof, one of said blocks being divided to form abutting sections one of which is connected to each free end of the band and means for connecting said block sections together, said sections when connected forming a block similar in configuration to the remaining blocks.

2. A driving belt comprising a flexible band and a series of transversely extending end-friction blocks secured on one face thereof, one of said blocks comprising two sections each secured to a free end of the band and means for connecting the said sections with their meeting faces abutting and each of a configuration which with the other forms a complete block similar to the remaining blocks.

3. A driving belt comprising a flexible band and a series of transversely extending end-friction blocks secured on one face thereof, one of said blocks being divided into two sections each secured to a free end of the band, a clamping plate for each block section between which and the block section the free end of the band is clamped and interlocking means on said plates for connecting the block sections together, said sections being such that when connected they form a block similar in construction to the remaining blocks.

4. A driving belt comprising a flexible band and a series of transversely extending end-friction blocks secured on one face thereof, one of said blocks being divided into two sections each secured to a free end of the band and means on the upper and lower faces of said blocks for connecting the same together with the meeting faces of the blocks abutting.

5. A driving belt comprising a flexible band and a series of transversely extending end-friction blocks secured on one face thereof, one of said blocks being divided into two sections each secured to a free end of the band, a series of interdigitating fingers on each section of the block and means passing through said interdigitating fingers when assembled for connecting the two sections of the block together, said sections when joined forming a block similar in configuration to the remaining blocks.

In witness whereof, I Paul B. Reeves have hereunto set my hand at Columbus, Indiana, this 22nd day of October, A. D. one thousand nine hundred and twenty-five.

PAUL B. REEVES.